US012249291B2

(12) United States Patent
Crounse

(10) Patent No.: US 12,249,291 B2
(45) Date of Patent: Mar. 11, 2025

(54) MULTI-PRIMARY DISPLAY MASK-BASED DITHERING WITH LOW BLOOMING SENSITIVITY

(71) Applicant: E INK CORPORATION, Billerica, MA (US)

(72) Inventor: Kenneth R. Crounse, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/519,840

(22) Filed: Nov. 27, 2023

(65) Prior Publication Data

US 2024/0096293 A1 Mar. 21, 2024

Related U.S. Application Data

(63) Continuation of application No. 17/981,104, filed on Nov. 4, 2022, now Pat. No. 11,869,451.

(60) Provisional application No. 63/276,048, filed on Nov. 5, 2021.

(51) Int. Cl.
*G09G 3/34* (2006.01)
*G09G 3/20* (2006.01)

(52) U.S. Cl.
CPC ........... *G09G 3/344* (2013.01); *G09G 3/2048* (2013.01); *G09G 2320/0242* (2013.01); *G09G 2340/0407* (2013.01)

(58) Field of Classification Search
CPC ................. G09G 3/344; G09G 3/2048; G09G 2320/0242; G09G 2340/0407; H04N 1/405
USPC .......................................................... 358/1.9
See application file for complete search history.

(56) References Cited

U.S. PATENT DOCUMENTS

| | | | |
|---|---|---|---|
| 5,930,026 | A | 7/1999 | Jacobson et al. |
| 6,017,584 | A | 1/2000 | Albert et al. |
| 6,445,489 | B1 | 9/2002 | Jacobson et al. |
| 6,504,524 | B1 | 1/2003 | Gates et al. |
| 6,512,354 | B2 | 1/2003 | Jacobson et al. |
| 6,531,997 | B1 | 3/2003 | Gates et al. |
| 6,545,797 | B2 | 4/2003 | Chen et al. |
| 6,664,944 | B1 | 12/2003 | Albert et al. |
| 6,753,999 | B2 | 6/2004 | Zehner et al. |
| 6,788,452 | B2 | 9/2004 | Liang et al. |
| 6,825,970 | B2 | 11/2004 | Goenaga et al. |
| 6,900,851 | B2 | 5/2005 | Morrison et al. |
| 7,012,600 | B2 | 3/2006 | Zehner et al. |
| 7,023,420 | B2 | 4/2006 | Comiskey et al. |
| 7,034,783 | B2 | 4/2006 | Gates et al. |

(Continued)

OTHER PUBLICATIONS

Pappas, Thrasyvoulos N. "Model-based halftoning of color images." IEEE Transactions on image processing 6.7 (1997): 1014-1024.

(Continued)

*Primary Examiner* — Abdul-Samad A Adediran
(74) *Attorney, Agent, or Firm* — Brian D. Bean

(57) ABSTRACT

Methods for driving color electrophoretic displays including a plurality of display pixels capable of producing a set of primary colors. The method comprises defining a separation cumulate threshold array and using the separation cumulate threshold array to identify areas of the electrophoretic display that are better suited for dithering and not dithering the areas of the electrophoretic display that exceed the separation cumulate threshold.

10 Claims, 10 Drawing Sheets
(9 of 10 Drawing Sheet(s) Filed in Color)

Output: $y(i,j) = P_k$ for $A_k(i,j) > T(i,j)$ but $A_{k-1}(i,j) \leq T(i,j)$

(56) References Cited

U.S. PATENT DOCUMENTS

| | | | |
|---|---|---|---|
| 7,038,656 | B2 | 5/2006 | Liang et al. |
| 7,038,670 | B2 | 5/2006 | Liang et al. |
| 7,046,228 | B2 | 5/2006 | Liang et al. |
| 7,052,571 | B2 | 5/2006 | Wang et al. |
| 7,061,166 | B2 | 6/2006 | Kuniyasu |
| 7,061,662 | B2 | 6/2006 | Chung et al. |
| 7,075,502 | B1 | 7/2006 | Drzaic et al. |
| 7,116,466 | B2 | 10/2006 | Whitesides et al. |
| 7,119,772 | B2 | 10/2006 | Amundson et al. |
| 7,167,155 | B1 | 1/2007 | Albert et al. |
| 7,177,066 | B2 | 2/2007 | Chung et al. |
| 7,193,625 | B2 | 3/2007 | Danner et al. |
| 7,202,847 | B2 | 4/2007 | Gates |
| 7,242,514 | B2 | 7/2007 | Chung et al. |
| 7,259,744 | B2 | 8/2007 | Arango et al. |
| 7,327,511 | B2 | 2/2008 | Whitesides et al. |
| 7,385,751 | B2 | 6/2008 | Chen et al. |
| 7,408,699 | B2 | 8/2008 | Wang et al. |
| 7,453,445 | B2 | 11/2008 | Amundson |
| 7,492,339 | B2 | 2/2009 | Amundson |
| 7,492,505 | B2 | 2/2009 | Liang et al. |
| 7,528,822 | B2 | 5/2009 | Amundson et al. |
| 7,583,251 | B2 | 9/2009 | Arango et al. |
| 7,602,374 | B2 | 10/2009 | Zehner et al. |
| 7,612,760 | B2 | 11/2009 | Kawai |
| 7,679,599 | B2 | 3/2010 | Kawai |
| 7,683,606 | B2 | 3/2010 | Kang et al. |
| 7,684,081 | B2 | 3/2010 | Miyata |
| 7,684,108 | B2 | 3/2010 | Wang et al. |
| 7,729,039 | B2 | 6/2010 | LeCain et al. |
| 7,787,169 | B2 | 8/2010 | Abramson et al. |
| 7,800,813 | B2 | 9/2010 | Wu et al. |
| 7,839,564 | B2 | 11/2010 | Whitesides et al. |
| 7,859,742 | B1 | 12/2010 | Chiu et al. |
| 7,910,175 | B2 | 3/2011 | Webber |
| 7,940,281 | B2 | 5/2011 | Wang et al. |
| 7,952,557 | B2 | 5/2011 | Amundson |
| 7,952,790 | B2 | 5/2011 | Honeyman et al. |
| 7,982,479 | B2 | 7/2011 | Wang et al. |
| 7,982,941 | B2 | 7/2011 | Lin et al. |
| 7,999,787 | B2 | 8/2011 | Amundson et al. |
| 8,040,594 | B2 | 10/2011 | Paolini, Jr. et al. |
| 8,054,526 | B2 | 11/2011 | Bouchard |
| 8,077,141 | B2 | 12/2011 | Duthaler et al. |
| 8,098,418 | B2 | 1/2012 | Paolini, Jr. et al. |
| 8,125,501 | B2 | 2/2012 | Amundson et al. |
| 8,130,192 | B2 | 3/2012 | Feng |
| 8,139,050 | B2 | 3/2012 | Jacobson et al. |
| 8,159,636 | B2 | 4/2012 | Sun et al. |
| 8,174,490 | B2 | 5/2012 | Whitesides et al. |
| 8,243,013 | B1 | 8/2012 | Sprague et al. |
| 8,274,472 | B1 | 9/2012 | Wang et al. |
| 8,289,250 | B2 | 10/2012 | Zehner et al. |
| 8,300,006 | B2 | 10/2012 | Zhou et al. |
| 8,314,784 | B2 | 11/2012 | Ohkami et al. |
| 8,363,299 | B2 | 1/2013 | Paolini, Jr. et al. |
| 8,373,649 | B2 | 2/2013 | Low et al. |
| 8,384,658 | B2 | 2/2013 | Albert et al. |
| 8,422,116 | B2 | 4/2013 | Sprague et al. |
| 8,456,414 | B2 | 6/2013 | Lin et al. |
| 8,462,102 | B2 | 6/2013 | Wong et al. |
| 8,503,063 | B2 | 8/2013 | Sprague |
| 8,514,168 | B2 | 8/2013 | Chung et al. |
| 8,537,105 | B2 | 9/2013 | Chiu et al. |
| 8,558,783 | B2 | 10/2013 | Wilcox et al. |
| 8,558,786 | B2 | 10/2013 | Lin |
| 8,558,855 | B2 | 10/2013 | Sprague et al. |
| 8,576,164 | B2 | 11/2013 | Sprague et al. |
| 8,576,259 | B2 | 11/2013 | Lin et al. |
| 8,576,470 | B2 | 11/2013 | Paolini, Jr. et al. |
| 8,576,475 | B2 | 11/2013 | Huang et al. |
| 8,605,032 | B2 | 12/2013 | Liu et al. |
| 8,605,354 | B2 | 12/2013 | Zhang et al. |
| 8,649,084 | B2 | 2/2014 | Wang et al. |
| 8,665,206 | B2 | 3/2014 | Lin et al. |
| 8,670,174 | B2 | 3/2014 | Sprague et al. |
| 8,681,191 | B2 | 3/2014 | Yang et al. |
| 8,704,756 | B2 | 4/2014 | Lin |
| 8,717,664 | B2 | 5/2014 | Wang et al. |
| 8,786,935 | B2 | 7/2014 | Sprague |
| 8,797,634 | B2 | 8/2014 | Paolini, Jr. et al. |
| 8,810,525 | B2 | 8/2014 | Sprague |
| 8,873,129 | B2 | 10/2014 | Paolini, Jr. et al. |
| 8,902,153 | B2 | 12/2014 | Bouchard et al. |
| 8,902,491 | B2 | 12/2014 | Wang et al. |
| 8,917,439 | B2 | 12/2014 | Wang et al. |
| 8,928,562 | B2 | 1/2015 | Gates et al. |
| 8,928,641 | B2 | 1/2015 | Chiu et al. |
| 8,928,688 | B2 | 1/2015 | Hung |
| 8,964,282 | B2 | 2/2015 | Wang et al. |
| 8,976,444 | B2 | 3/2015 | Zhang et al. |
| 9,013,394 | B2 | 4/2015 | Lin |
| 9,013,783 | B2 | 4/2015 | Sprague |
| 9,019,197 | B2 | 4/2015 | Lin |
| 9,019,198 | B2 | 4/2015 | Lin et al. |
| 9,019,318 | B2 | 4/2015 | Sprague et al. |
| 9,036,204 | B2 | 5/2015 | Kakutani |
| 9,082,352 | B2 | 7/2015 | Cheng et al. |
| 9,116,412 | B2 | 8/2015 | Lin |
| 9,146,439 | B2 | 9/2015 | Zhang |
| 9,182,646 | B2 | 11/2015 | Paolini, Jr. et al. |
| 9,195,111 | B2 | 11/2015 | Anseth et al. |
| 9,199,441 | B2 | 12/2015 | Danner |
| 9,218,773 | B2 | 12/2015 | Sun et al. |
| 9,224,338 | B2 | 12/2015 | Chan et al. |
| 9,224,342 | B2 | 12/2015 | Lin et al. |
| 9,224,344 | B2 | 12/2015 | Chung et al. |
| 9,230,492 | B2 | 1/2016 | Harrington et al. |
| 9,262,973 | B2 | 2/2016 | Wu et al. |
| 9,285,649 | B2 | 3/2016 | Du et al. |
| 9,299,294 | B2 | 3/2016 | Lin et al. |
| 9,341,916 | B2 | 5/2016 | Telfer et al. |
| 9,360,733 | B2 | 6/2016 | Wang et al. |
| 9,361,836 | B1 | 6/2016 | Telfer et al. |
| 9,390,066 | B2 | 7/2016 | Smith et al. |
| 9,390,661 | B2 | 7/2016 | Chiu et al. |
| 9,423,666 | B2 | 8/2016 | Wang et al. |
| 9,459,510 | B2 | 10/2016 | Lin |
| 9,460,666 | B2 | 10/2016 | Sprague et al. |
| 9,495,918 | B2 | 11/2016 | Harrington et al. |
| 9,501,981 | B2 | 11/2016 | Lin et al. |
| 9,513,527 | B2 | 12/2016 | Chan et al. |
| 9,513,743 | B2 | 12/2016 | Sjodin et al. |
| 9,514,667 | B2 | 12/2016 | Lin |
| 9,541,814 | B2 | 1/2017 | Lin et al. |
| 9,612,502 | B2 | 4/2017 | Danner et al. |
| 9,620,048 | B2 | 4/2017 | Sim et al. |
| 9,671,668 | B2 | 6/2017 | Chan et al. |
| 9,672,766 | B2 | 6/2017 | Sjodin |
| 9,691,333 | B2 | 6/2017 | Cheng et al. |
| 9,721,495 | B2 | 8/2017 | Harrington et al. |
| 9,759,980 | B2 | 9/2017 | Du et al. |
| 9,792,861 | B2 | 10/2017 | Chang et al. |
| 9,792,862 | B2 | 10/2017 | Hung et al. |
| 9,812,073 | B2 | 11/2017 | Lin et al. |
| 9,818,336 | B2 | 11/2017 | Yaras et al. |
| 10,162,242 | B2 | 12/2018 | Wang et al. |
| 10,209,556 | B2 | 2/2019 | Rosenfeld et al. |
| 10,229,641 | B2 | 3/2019 | Yang et al. |
| 10,270,939 | B2 | 4/2019 | Crounse |
| 10,319,313 | B2 | 6/2019 | Harris et al. |
| 10,339,876 | B2 | 7/2019 | Lin et al. |
| 10,444,592 | B2 | 10/2019 | Bouchard |
| 10,467,984 | B2 | 11/2019 | Buckley et al. |
| 10,514,583 | B2 | 12/2019 | Zhang |
| 10,672,350 | B2 | 6/2020 | Amundson et al. |
| 11,049,463 | B2 | 6/2021 | Lin et al. |
| 11,151,951 | B2 | 10/2021 | Lin et al. |
| 2003/0102858 | A1 | 6/2003 | Jacobson et al. |
| 2004/0246562 | A1 | 12/2004 | Chung et al. |
| 2005/0253777 | A1 | 11/2005 | Zehner et al. |
| 2007/0103427 | A1 | 5/2007 | Zhou et al. |
| 2007/0176912 | A1 | 8/2007 | Beames et al. |
| 2008/0024429 | A1 | 1/2008 | Zehner |

(56) References Cited

U.S. PATENT DOCUMENTS

| | | | |
|---|---|---|---|
| 2008/0024482 | A1 | 1/2008 | Gates et al. |
| 2008/0043318 | A1 | 2/2008 | Whitesides et al. |
| 2008/0136774 | A1 | 6/2008 | Harris et al. |
| 2008/0303780 | A1 | 12/2008 | Sprague et al. |
| 2009/0097045 | A1 * | 4/2009 | Miyata .................. H04N 1/405 358/1.9 |
| 2009/0225398 | A1 | 9/2009 | Duthaler et al. |
| 2010/0156780 | A1 | 6/2010 | Jacobson et al. |
| 2010/0194733 | A1 | 8/2010 | Lin et al. |
| 2010/0194789 | A1 | 8/2010 | Lin et al. |
| 2010/0265561 | A1 | 10/2010 | Gates et al. |
| 2011/0043543 | A1 | 2/2011 | Chen et al. |
| 2011/0063314 | A1 | 3/2011 | Chiu et al. |
| 2011/0221740 | A1 | 9/2011 | Yang et al. |
| 2012/0001957 | A1 | 1/2012 | Liu et al. |
| 2012/0098740 | A1 | 4/2012 | Chiu et al. |
| 2013/0063333 | A1 | 3/2013 | Arango et al. |
| 2013/0249782 | A1 | 9/2013 | Wu et al. |
| 2014/0055840 | A1 | 2/2014 | Zang et al. |
| 2014/0078576 | A1 | 3/2014 | Sprague |
| 2014/0204012 | A1 | 7/2014 | Wu et al. |
| 2014/0240210 | A1 | 8/2014 | Wu et al. |
| 2014/0253425 | A1 | 9/2014 | Zalesky et al. |
| 2014/0293398 | A1 | 10/2014 | Wang et al. |
| 2014/0362213 | A1 | 12/2014 | Tseng |
| 2015/0262255 | A1 | 9/2015 | Khajehnouri et al. |
| 2015/0268531 | A1 | 9/2015 | Wang et al. |
| 2015/0301246 | A1 | 10/2015 | Zang et al. |
| 2016/0180777 | A1 | 6/2016 | Lin et al. |
| 2018/0254020 | A1 * | 9/2018 | Buckley ................. G09G 3/344 |

OTHER PUBLICATIONS

Korean Intellectual Property Office, "International Search Report and Written Opinion", PCT/US2022/049037, Mar. 15, 2023.

* cited by examiner

Source space dithering using Kuhn decomposition

Source space dithering using Kuhn decomposition

MULTI-PRIMARY DISPLAY MASK-BASED DITHERING WITH LOW BLOOMING SENSITIVITY

RELATED APPLICATIONS

This application is a continuation of U.S. patent application Ser. No. 17/981,104, filed Nov. 2, 2022, published as U.S. Patent Publication No. 2023/0145248, which claims priority to U.S. Provisional Patent Application No. 63/276,048, filed Nov. 5, 2021. All patents and publications disclosed herein are incorporated by reference in their entireties.

BACKGROUND

This invention relates to a method and apparatus for rendering color images. More specifically, this invention relates to a method for multi-color dithering, where a combination of color intensities are converted into a multi-color surface coverage.

The term "pixel" is used herein in its conventional meaning in the display art to mean the smallest unit of a display capable of generating all the colors which the display itself can show.

Half-toning has been used for many decades in the printing industry to represent gray tones by covering a varying proportion of each pixel of white paper with black ink. Similar half-toning schemes can be used with CMY or CMYK color printing systems, with the color channels being varied independently of each other. That is to say, at each pixel of white paper, any one of the colors (e.g., CMY, e.g., CMYK) can be independently printed at that pixel of white paper without having an influence on neighboring pixels.

However, there are known color systems in which the color channels cannot be varied independently of one another, in as much as each pixel can display any one of a limited set of primary colors (such systems may hereinafter be referred to as "limited palette displays" or "LPD's", which could be CMY or RGB), having a particular color at a first pixel influences the color, i.e., the quality of the color with respect to a target color, at one or more immediate neighboring pixels. Such behavior is observed in electrophoretic color displays (EPD) where the electric field of a first pixel influences the target color at an immediate neighbor pixel. This phenomenon is known generally as "blooming." To some extent, in color EPDs, the colors can be spatially dithered to produce the correct color sensation.

Electronic displays typically include an active matrix backplane, a master controller, local memory and a set of communication and interface ports. The master controller receives data via the communication/interface ports or retrieves it from the device memory. Once the data is in the master controller, it is translated into a set of instruction for the active matrix backplane. The active matrix backplane receives these instructions from the master controller and produces the image. In the case of a color EPD, on-device gamut computations may require a master controller with increased computational power. Rendering methods for color electrophoretic displays are often computational intense, and although, as discussed in detail below, the present invention itself provides methods for reducing the computational load imposed by rendering, both the rendering (dithering) step and other steps of the overall rendering process may still impose major loads on device computational processing systems.

The increased computational power required for image rendering diminishes the advantages of electrophoretic displays in some applications. In particular, the cost of manufacturing the device increases, as does the device power consumption, when the master controller is configured to perform complicated rendering algorithms. Furthermore, the extra heat generated by the controller requires thermal management. Accordingly, at least in some cases, as for example when very high resolution images, or a large number of images need to be rendered in a short time, it may be desirable to have an efficient method for dithering multi-colored images.

SUMMARY

In one aspect, a method for driving a color electrophoretic display having a plurality of display pixels in an array. Each display pixel being capable of displaying at least three primary colors, the method including receiving an input image, processing the input image to define a separation cumulate at each pixel, defining a separation cumulate threshold array wherein each member of the array is at least two pixels by two pixels in size, and includes a different separation cumulate threshold for each of the three primaries, and sending an instruction to each pixel to display the primary color corresponding to the first separation cumulate threshold that is exceeded by the separation cumulate at that pixel. In some embodiments the primary color at each pixel (i,j) is determined by $y(i,j)=P_k$ for $\Lambda_k(i,j)>T(i,j)$ but $\Lambda_{k-1}(i,j)\leq T(i,j)$. In some embodiments, the dither function uses a. Blue Noise Mask (BNM). In some embodiments, processing the input image step is implemented by a look up table. In some embodiments, the input image is put through a sharpening filter before processing the input image. In some embodiments, the sharpening filter is a finite impulse response (FIR) filter. In some embodiments, the step of processing the input image to create color separation cumulate includes using a Barycentric coordinate method. In some embodiments, the primary colors are cyan, yellow, magenta, and black. In some embodiments, the primary colors are red, green, blue, and white. In some embodiments, the primary colors are white, red, green, blue, cyan, yellow, magenta, and black. The invention additionally includes electrophoretic displays configured to carry out the method described above. In some embodiments, the electrophoretic display includes electrophoretic materials having a plurality of electrically charged particles disposed in a fluid and capable of moving through the fluid under the influence of an electric field. In some embodiments, the electrically charged particles and the fluid are confined within a plurality of capsules or microcells.

BRIEF DESCRIPTION OF DRAWINGS

The patent or application file contains at least one drawing executed in color. Copies of this patent or patent application publication with color drawing(s) will be provided by the Office upon request and payment of the necessary fee, FIG. 1 of the accompanying drawings is an error diffusion model in accordance with the subject matter presented herein.

DETAILED DESCRIPTION

Figure 1:
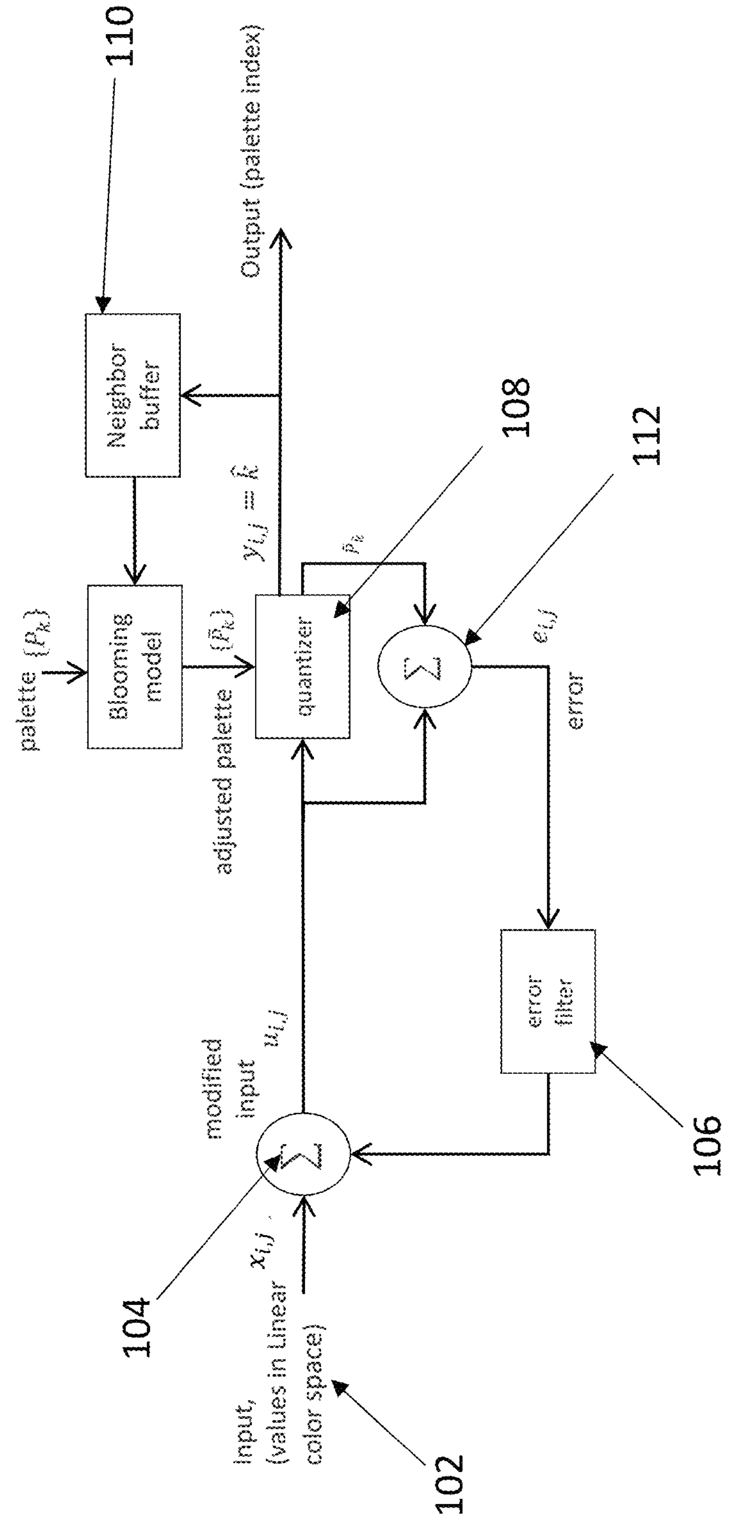

The invention provides methods for driving color electrophoretic displays having a plurality of display pixels capable of producing a set of primary colors. The primary set is arbitrarily large, but typically will include at least four colors. By defining a separation cumulate threshold array areas of the electrophoretic display can be identified that are better suited for dithering, while not dithering the areas of the electrophoretic display that exceed the separation cumulate threshold.

Standard dithering algorithms such as error diffusion algorithms (in which the "error" introduced by printing one pixel in a particular color which differs from the color theoretically required at that pixel is distributed among neighboring pixels so that overall the correct color sensation is produced) can be employed with limited palette displays. There is an enormous literature on error diffusion; for a review see Pappas, Thrasyvoulos N. "Model-based halftoning of color images," *IEEE Transactions on Image Processing* 6.7 (1997): 1014-1024.

This application is also related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777. These patents and applications may hereinafter for convenience collectively be referred to as the "MEDEOD" (MEthods for Driving Electro-Optic Displays) applications, and are incorporated herein in their entirety by reference.

EPD systems exhibit certain peculiarities that must be taken into account in designing dithering algorithms for use in such systems. Inter-pixel artifacts are a common feature in such systems. One type of artifact is caused by so-called "blooming"; in both monochrome and color systems, there is a tendency for the electric field generated by a pixel electrode to affect an area of the electro-optic medium wider than that of the pixel electrode itself so that, in effect, one pixel's optical state spreads out into parts of the areas of adjacent pixels. Another kind of crosstalk is experienced when driving adjacent pixels brings about a final optical state, in the area between the pixels that differs from that reached by either of the pixels themselves, this final optical state being caused by the averaged electric field experienced in the inter-pixel region. Similar effects are experienced in monochrome systems, but since such systems are one-dimensional in color space, the inter-pixel region usually displays a gray state intermediate the states of the two adjacent pixel, and such an intermediate gray state does not greatly affect the average reflectance of the region, or it can easily be modeled as an effective blooming. However, in a color display, the inter-pixel region can display colors not present in either adjacent pixel.

The aforementioned problems in color displays have serious consequences for the color gamut and the linearity of the color predicted by spatially dithering primaries. Consider using a spatially dithered pattern of saturated Red and Yellow from the primary palette of an EPD display to attempt to create a desired orange color. Without crosstalk, the combination required to create the orange color can be predicted perfectly in the far field by using linear additive color mixing laws. Since Red and Yellow are on the color gamut boundary, this predicted orange color should also be on the gamut boundary. However, if the aforementioned effects produce (say) a blueish band in the inter-pixel region between adjacent Red and Yellow pixels, the resulting color will be much more neutral than the predicted orange color. This results in a "dent" in the gamut boundary, or, to be more accurate since the boundary is actually three-dimensional, a scallop. Thus, not only does a naïve dithering approach fail to accurately predict the required dithering, but it may as in this case attempt to produce a color which is not available since it is outside the achievable color gamut.

It may desirable for one to be able to predict the achievable gamut by extensive measurement of patterns or advanced modeling. This may be not be feasible if the number of device primaries is large, or if the crosstalk errors are large compared to the errors introduced by quantizing pixels to a primary colors. The present invention provides a dithering method that incorporates a model of blooming-'crosstalk errors such that the realized color on the display is closer to the predicted color. Furthermore, the method stabilizes the error diffusion in the case that the desired color falls outside the realizable gamut, since normally error diffusion will produce unbounded errors when dithering to colors outside the convex hull of the primaries.

In some embodiments the reproduction of images may be performed using an Error-Diffusion model illustrated in FIG. 1 of the accompanying drawings. The method illustrated in FIG. 1 begins at an input 102, where color values $x_{i,j}$ are fed to a processor 104, where they are added to the output of an error filter 106 to produce a modified input $u_{i,j}$, which may hereinafter be referred to as "error-modified input colors" or "EMIC". The modified inputs $u_{i,j}$ are fed to a Quantizer 108.

In some embodiments, processes utilizing model-based error diffusion can become unstable, because the input image is assumed to lie in the (theoretical) convex hull of the primaries (i.e. the color gamut), but the actual realizable gamut is likely smaller due to loss of gamut because of dot overlap. Therefore, the error diffusion algorithm may be trying to achieve colors which cannot actually be achieved in practice and the error continues to grow with each successive "correction". It has been suggested that this problem be contained by clipping or otherwise limiting the error, but this leads to other errors.

In practice, one solution would be to have a better, non-convex estimate of the achievable gamut when performing gamut mapping of the source image, so that the error diffusion algorithm can always achieve its target color. It may be possible to approximate this from the model itself, or determine it empirically. In some embodiments, the quantizer 108 examines the primaries for the effect that choosing each would have on the error, and the quantizer chooses the primary with the least (by some metric) error if chosen. However, the primaries fed to the quantizer 108 are not the natural primaries of the system, $\{P_k\}$, but are an adjusted set of primaries, $\{P^{\sim}_k\}$, which allow for the colors of at least some neighboring pixels, and their effect on the pixel being quantized by virtue of blooming or other inter-pixel interactions.

One embodiment of the above method may use a standard Floyd-Steinberg error filter and processes pixels in raster order. Assuming, as is conventional, that the display is treated top-to-bottom and left-to-right, it is logical to use the above and left cardinal neighbors of pixel being considered to compute blooming or other inter-pixel effects, since these two neighboring pixels have already been determined. In this way, all modeled errors caused by adjacent pixels are accounted for since the right and below neighbor crosstalk is accounted for when those neighbors are visited. If the model only considers the above and left neighbors, the adjusted set of primaries must be a function of the states of those neighbors and the primary under consideration. The simplest approach is to assume that the blooming model is additive, i.e. that the color shift due to the left neighbor and the color shift due to the above neighbor are independent and additive. In this case, there are only "N choose 2" (equal to N*(N−1)/2) model parameters (color shifts) that need to be determined. For N=64 or less, these can be estimated from colorimetric measurements of checkerboard patterns of all these possible primary pairs by subtracting the ideal mixing law value from the measurement.

To take a specific example, consider the case of a display having 32 primaries. If only the above and left neighbors are considered, for 32 primaries there are 496 possible adjacent sets of primaries for a given pixel. Since the model is linear, only these 496 color shifts need to be stored since the additive effect of both neighbors can be produced during run time without much overhead. So for example if the unadjusted primary set comprises (P1 . . . P32) and your current up, left neighbors are P4 and P7, the modified primaries ($P^{\sim}_1 \ldots P^{\sim}_{32}$), the adjusted primaries fed to the quantizer are given by:

$$P^{\sim}_1 = P_1 + dP_{(1,4)} + dP_{(1,7)};$$

. . . . . . .

$$P^{\sim}_{32} = P_{32} + dP_{(32,4)} + dP_{(32,7)},$$

where $dP_{(i,j)}$ are the empirically determined values in the color shift table.

More complicated inter-pixel interaction models are of course possible, for example nonlinear models, models taking account of corner (diagonal) neighbor, or models using a non-causal neighborhood for which the color shift at each pixel is updated as more of its neighbors are known.

The quantizer 108 compares the adjusted inputs $u'_{i,j}$ with the adjusted primaries $\{P^{\sim}_k\}$ and outputs the most appropriate primary $y_{i,k}$ to an output. Any appropriate method of selecting the appropriate primary may be used, for example a minimum Euclidean distance quantizer in a linear RCM space; this has the advantage of requiring less computing power than some alternative methods.

The $y_{i,k}$ output values from the quantizer 108 may be fed not only to the output but also to a neighborhood buffer 110, where they are stored for use in generating adjusted primaries for later-processed pixels. The modified input $u_{i,j}$ values and the output $y_{i,j}$ values are both supplied to a processor 112, which calculates:

$$e_{i,j} = u_{i,j} - y_{i,j}$$

and passes this error signal on to the error filter 106 in the same way as described above with reference to FIG. 1.

However, in practice, error diffusion based methods may be slow for some applications because they are not easily parallelizable. Where the next pixel output cannot be completed until a previous pixel's output becomes available. Alternatively, masked based methods may be adopted because of their simplicity, where the output at each pixel depends only on that pixel's input and a value from a look-up-table (LUT), meaning each output can be computed completely independently of others.

Figure 2:
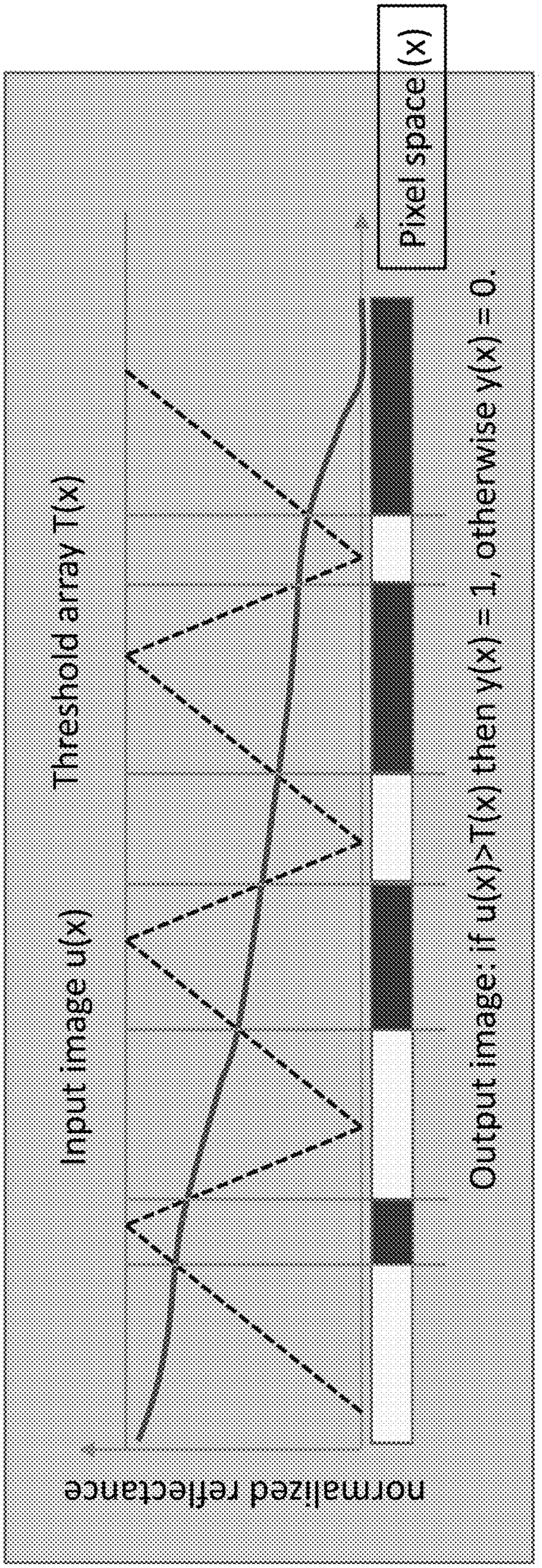
FIG. 2 is an exemplary black and white dithering method using masks in accordance with the subject matter presented herein.
Figure 3:
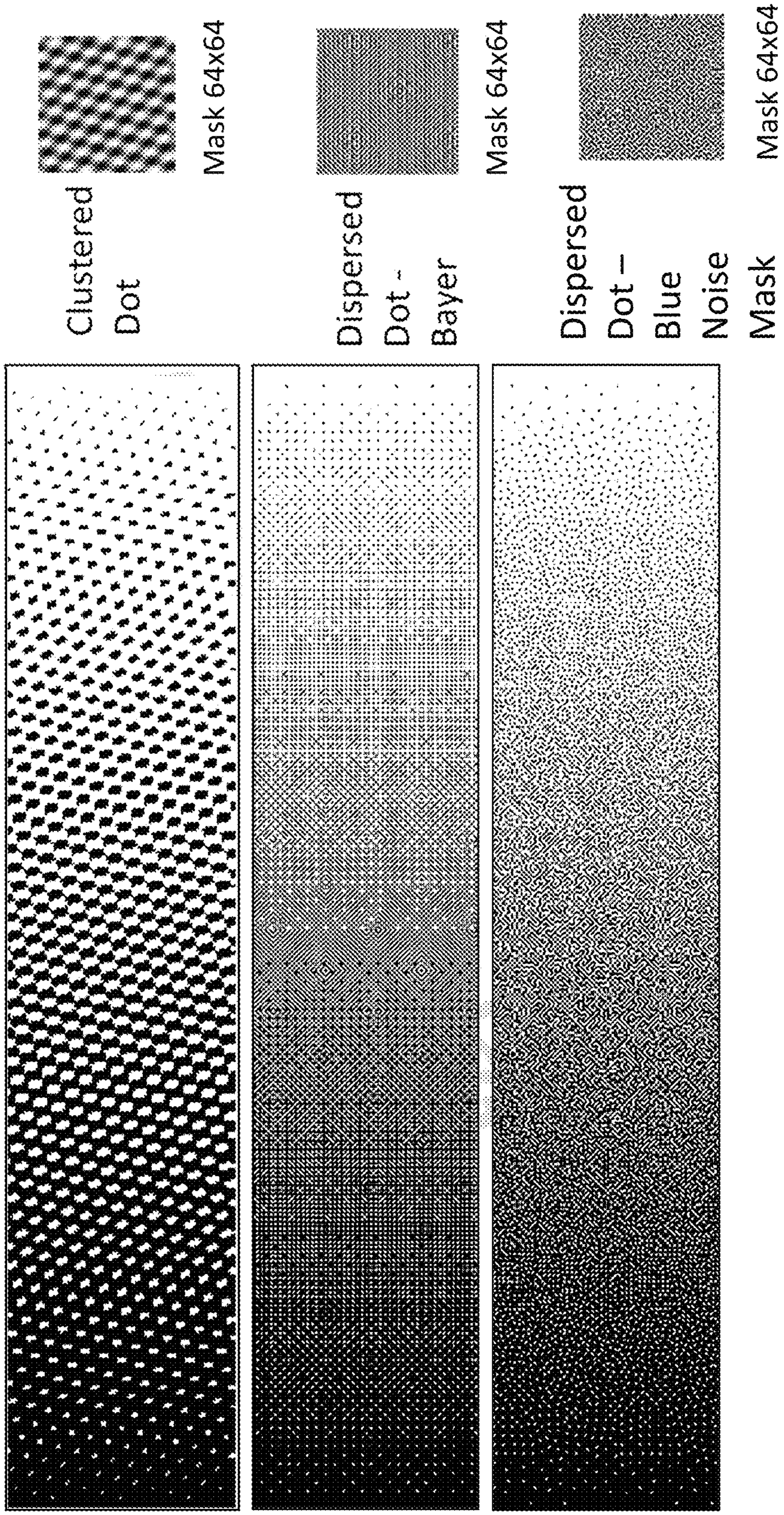
FIG. 3 illustrates various mask designs in accordance with the subject matter presented herein.

Referring now to FIG. 2, where an exemplary black and white dithering method is illustrated. As shown, an input grayscale image with normalized darkness values between 0 (white) and 1 (black) is dithered by comparing at each output location corresponding input darkness and dither threshold values. For example, if the darkness u(x) of an input image is higher than the dither threshold value T(x), then the output location is marked as black (i.e., 1), else it is marked as white (i.e., 0). FIG. 3 illustrates some mask designs in accordance with the subject matter disclosed herein.

Figure 4:
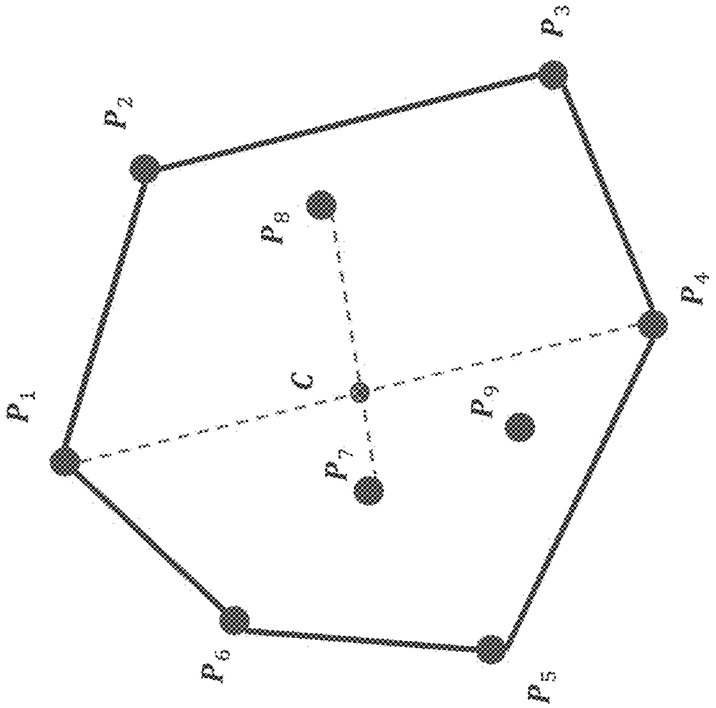
FIG. 4 illustrates a gamut color mapping in accordance with the subject matter disclosed herein.

In practice, when practicing multi-color dithering, it is assumed that the input colors to a dithering algorithm can be represented as a linear combination of multi-primaries. This may be achieved by dithering in the source space using gamut corners, or by gamut mapping the input to the device space color gamut. FIG. 4 illustrates one method of creating a color separation using a set of weights Px. Where each color C is defined as—

$$C = \sum_{i=1,\ldots N} \alpha_i(C) P_i$$

$$0 \le \alpha_i \le 1, \sum \alpha_i = 1$$

Where the partial sums of these weights is referred to as separation cumulate $\Lambda_k(C)$, where $$\Lambda_k(C) = \sum_{i=1,\ldots k} \alpha_i(C)$$

Figure 5:
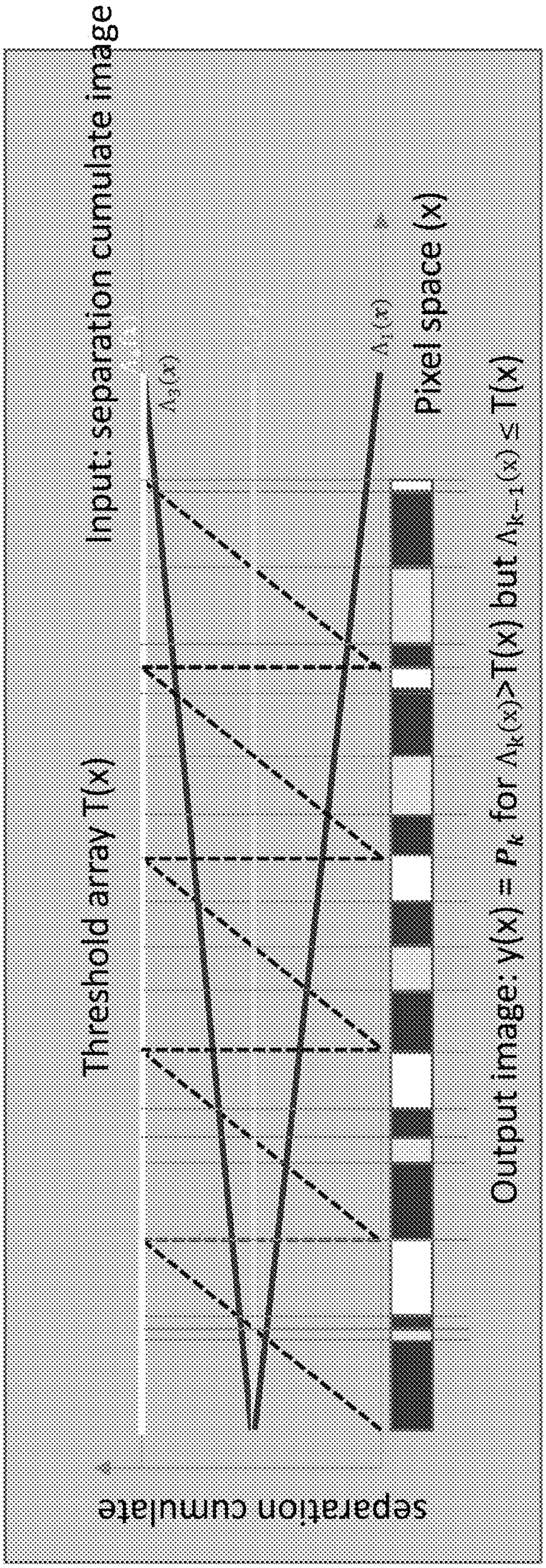
FIG. 5 illustrates a multi-color dithering method using masks in accordance with the subject matter disclosed herein.

In practice, dithering to multiple colors consists in intersecting the relative cumulative amounts of colors with a dither function (e.g., threshold array T(x) of FIG. 5). Referring now to FIG. 5, illustrated here as an example is a method to print with 4 different colors inks $C_1$, $C_2$, $C_3$ and $C_4$. At each pixel of the output pixmap, the color separation gives the relative percentages of each of the basic colors, for example $d_1$ of color $C_1$, $d_2$ of color $C_2$, $d_3$ of color $C_3$, and $d_4$ of color $C_4$. Where one of the colors, for example $C_4$, may be white.

Extending dithering to multiple colors consists in intersecting the relative cumulative amounts of colors $\Lambda_1(x)=d1$, $\Lambda_2(x)=d1+d2$, $\Lambda_3(x)=d1+d2+d3$, and $\Lambda_4(x)=d1+d2+d3+d4$ with a threshold array T(x), as illustrated in FIG. 5. Illustrated in FIG. 5 is a dithering example for the purpose of explaining the subject matter presented herein. In the interval where $\Lambda_1(x)>T(x)$, the output location or pixel region will be printed with basic color $C_1$; in the interval where $\Lambda_2(x)>T(x)$, the output location or pixel region will display color $C_2$; in the interval where $\Lambda_3(x)>T(x)$, the output location or pixel region will display color $C_3$; and in the remaining interval where $\Lambda_4(x)>T(x)$ and $\Lambda_3(x)\le T(x)$, the output location or pixel region will display color $C_4$. As such, multi-color dithering as presented herein will convert the relative amounts of $d_1$, $d_2$, $d_3$, $d_4$ of colors $C_1$, $C_2$, $C_3$ and $C_4$ into relative coverage percentages and ensures by construction that the contributing colors are printed side by side.

Figure 6:
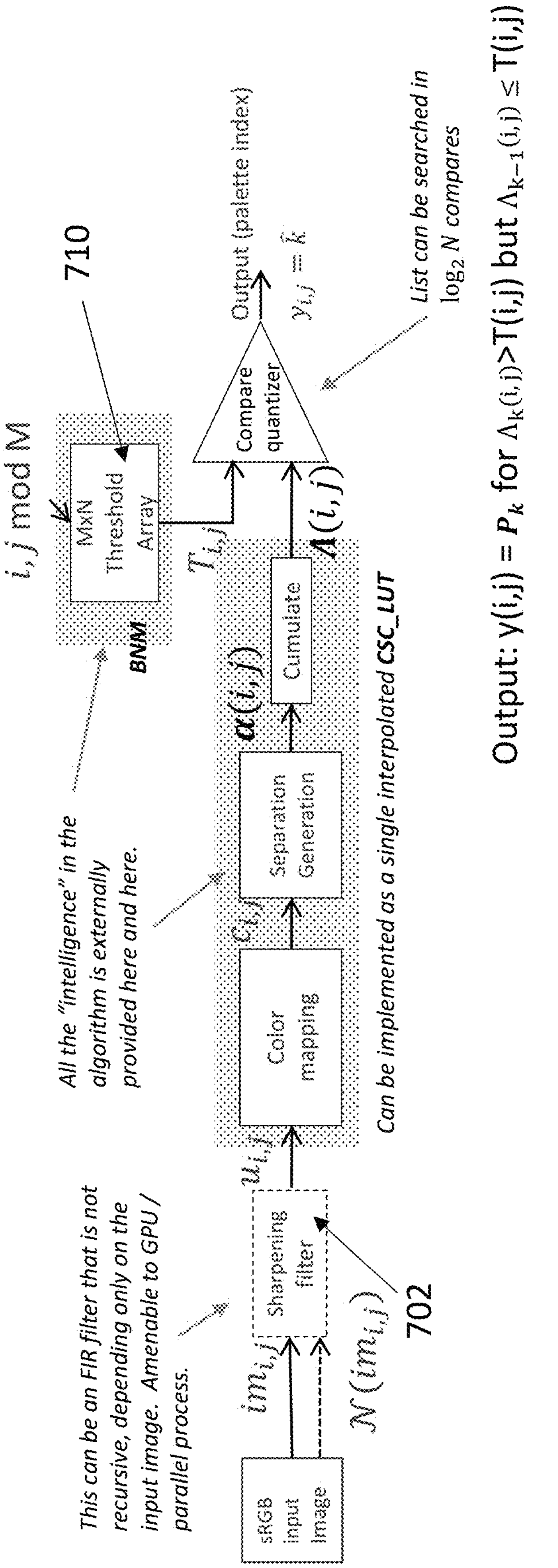
FIG. 6 illustrates a multi-color dithering algorithm using masks in accordance with the subject matter disclosed herein.
Figure 7:
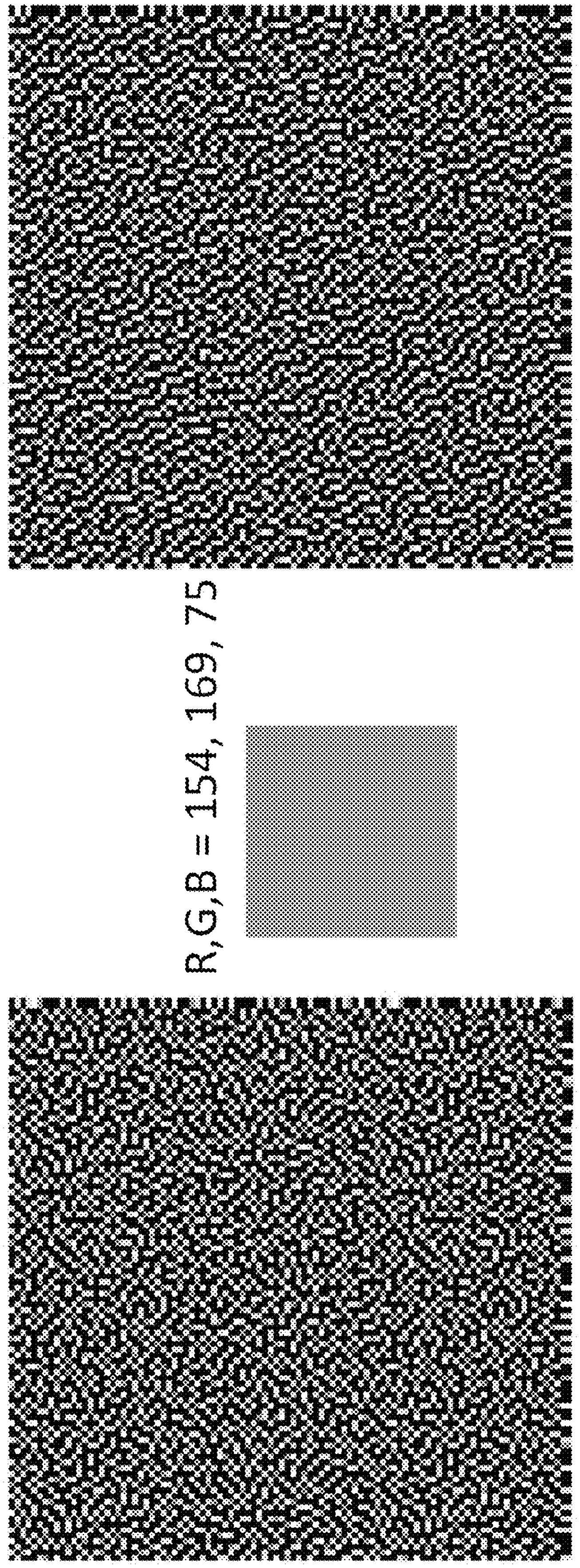
FIG. 7 is an embodiment of a mask design for multi-color dithering in accordance with the subject matter presented herein.
Figure 8:
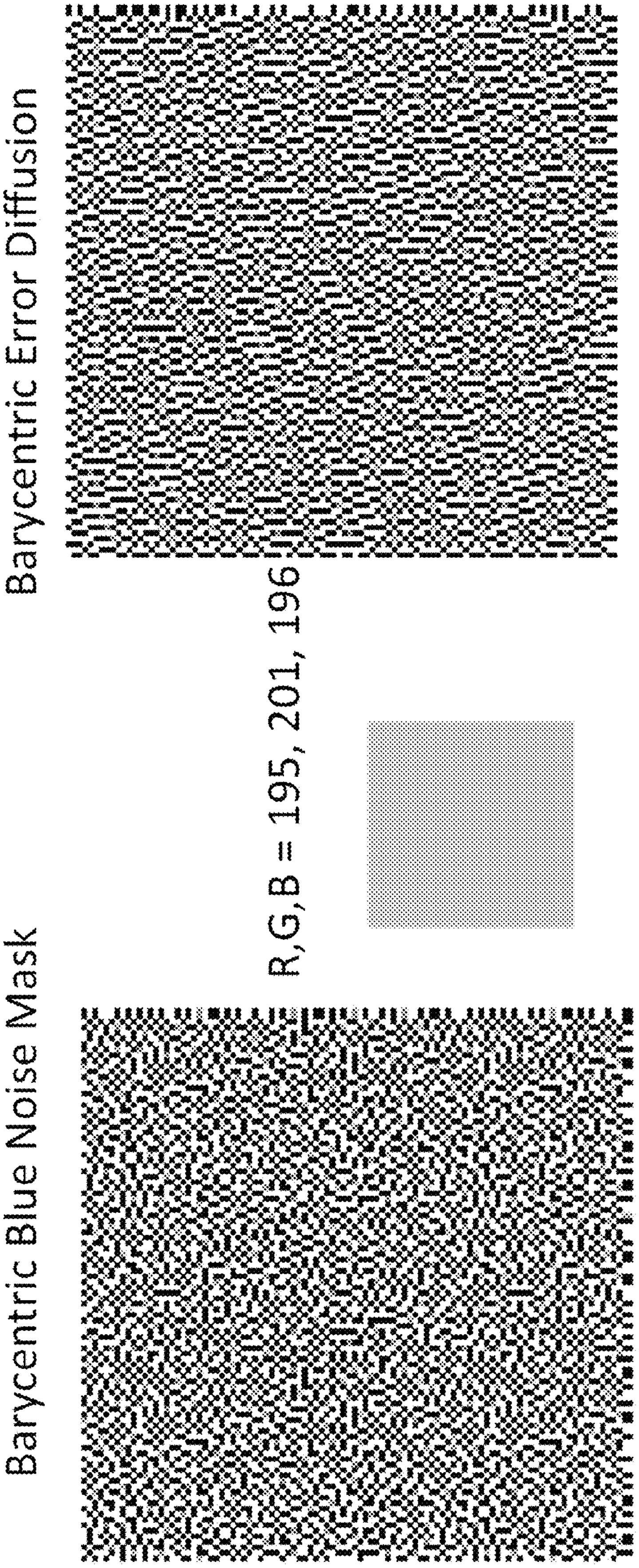
FIG. 8 is an embodiment of a mask design for multi-color dithering in accordance with the subject matter presented herein.
Figure 9:
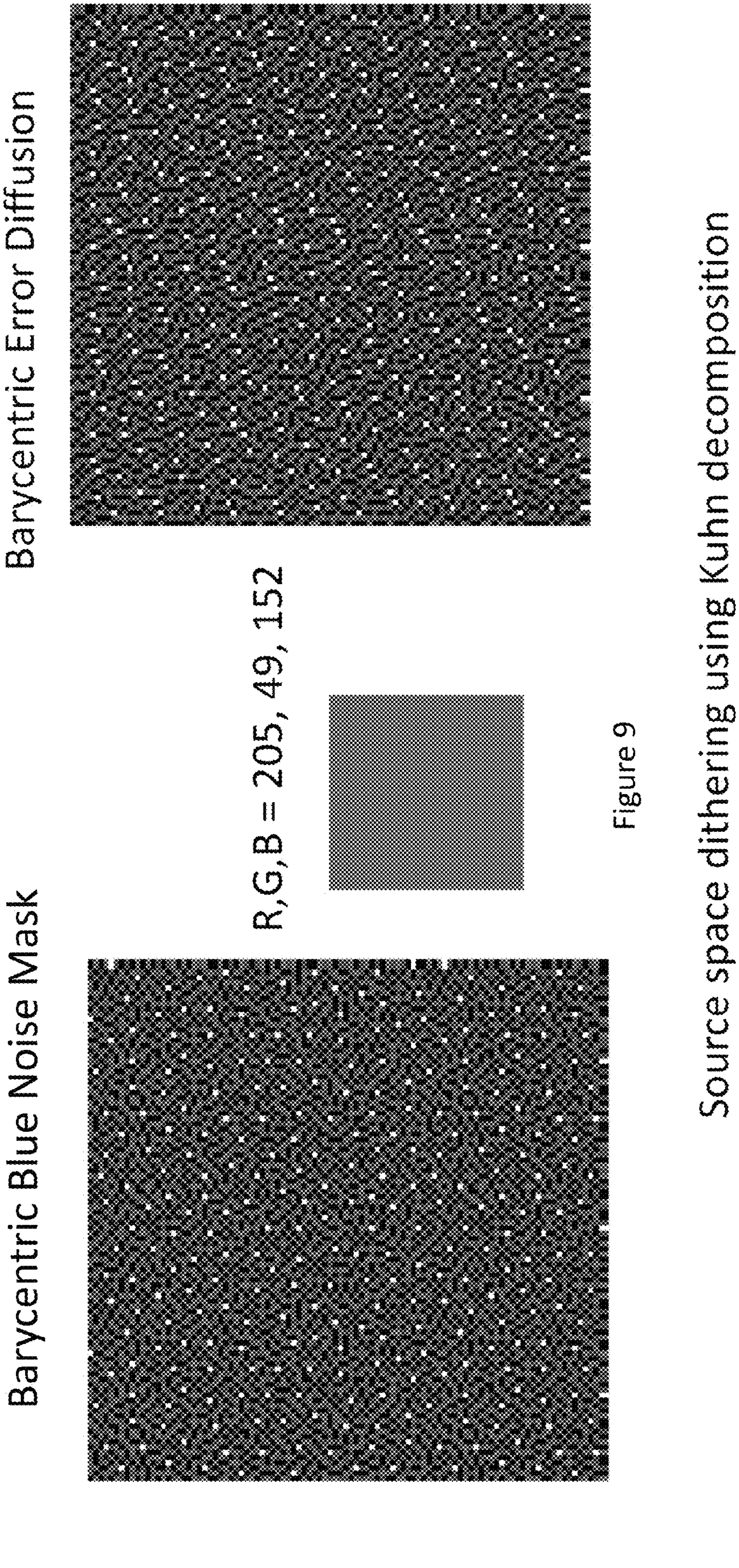
FIG. 9 is an embodiment of a mask design for multi-color dithering in accordance with the subject matter presented herein.
Figure 10:
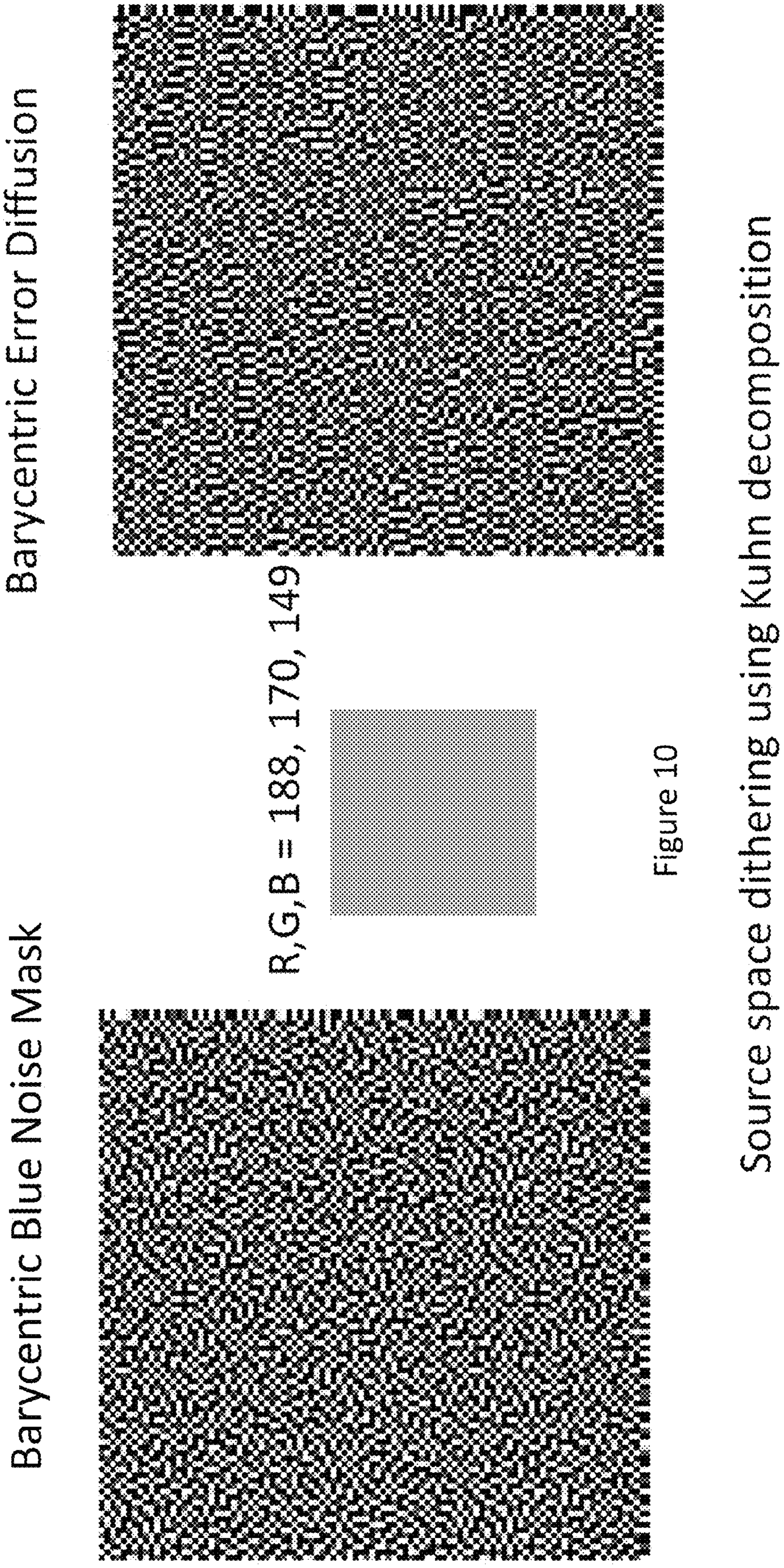
FIG. 10 is an embodiment of a mask design for multi-color dithering in accordance with the subject matter presented herein.

In some embodiments, a multi-color rendering algorithm as illustrated in FIG. 6 may be utilized in accordance with the subject matter disclosed herein. As shown, image data may be firstly fed through a sharpening filter 702, which may be optional in some embodiments. This sharpening filter 702 may be useful in some cases when a threshold array T(x) or filter is less sharp than an error diffusion system. This sharpening filter 702 may be a simple FIR filter, for example 3×3, which may be easily computed. Subsequently, color data may be mapped and color separation may be generated using methods illustrated in FIGS. 2-5, and this color data may be used to index a CSC_LUT look up table, which can have N-entries per index that gives the desired separation information in the form that is directly needed by the mask based dithering step. In some embodiments, this CSC_LUT look up table may be built by combining both a desired color enhancement and/or gamut mapping, and the chosen separation algorithm. Finally, the separation cumulate data is used with a threshold array 710 to generate an output $y_{i,j}$ to generate multiple colors. Illustrated in FIGS. 7-10 are dithering results using various mask designs.

In some embodiments, the particular threshold array T(x) or mask used may be optimized to minimize a so called blooming effect. Blooming is when using dithering in an electrophoretic display, the output at each pixel can spill or cross over into adjacent pixels and affect its optical state. This is akin to "dot gain" in printing systems. In some cases, the blooming effect can cause the average color of the dither pattern to be significantly different than the desired color that was predicted by averaging the colors in the pattern in a linear color space. In particular, the resulting colors will often be worse, meaning that the overall gamut of colors that can be achieved on the display is much less than the ideal gamut volume.

In practice, for the same amount of physical blooming, the problem may be more severe with higher resolution backplanes (smaller pixels) because the total edge length per unit area is larger. One method to mitigate this problem is to double-up pixels in the output so that the effective resolution is lower. In the extreme, even larger groupings (i.e., super pixels) can be used until the edge artifact area is such a low fraction of the total area that the ideal gamut is recovered. This may be achieved by first down-sampling the source image to half the display resolution, applying the nominal rendering system, and then up-sampling by replication to the display resolution.

Alternatively, this issue may be solved in dithering algorithm itself. In some embodiments, if the pixels were allowed to be doubled-up in smooth areas with low detail but were not double in areas with fine detail, this tradeoff with resolution would be less severe. This can be achieved using a mask based dithering system by clustering the thresholds in the mask (instead of clustering the output pixels). For example, if there is a sharp input image transition that happens in the middle of a threshold cluster it will be reflected in the output since part of the sharp change will be below the threshold and part will be above. In particular bi-level text will always pass directly through the mask unchanged with no loss of detail.

In practice, a mask with blooming-mitigating clustering may be achieved in several ways. One approach is to take a dispersed dot or blue noise mask that are not clustered, which is defined on a rectilinear tile of pixels, and make a new mask that is twice as large where each threshold element is replicated into a 2×2 pixel area. Furthermore, this approach can be extended to any M×N possibly rectangular replication size. Alternatively, because of the strong human visual system sensitivity to horizontal and vertical spatial frequencies, it may be advantageous to make clusters using other periodic tiles than rectangles. For example, identical threshold clusters of total 5 pixels can be used to tile the mask with spatial frequency of an angle of about 26.6 degrees (arc tan (½)).

For further details of color display systems to which the present invention can be applied, the reader is directed to the aforementioned EPD patents (which also give detailed discussions of electrophoretic displays) and to the following patents and publications: U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,182,646; 9,195,111; 9,199,441; 9,268,191; 9,285,649; 9,293,511; 9,341,916; 9,360,733; 9,361,836; and 9,423,666; and U.S. Patent Applications Publication Nos. 2008/0043318; 2008/0048970; 2009/

0225398; 2010/0156780; 2011/0043543; 2012/0326957; 2013/0242378; 2013/0278995; 2014/0055840; 2014/0078576; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A color electrophoretic display comprising:

a display including an active matrix of display pixels coupled to a color electrophoretic medium, each display pixel being capable of displaying at least three primary colors;

device memory comprising stored image data; and a master controller coupled to the display and the device memory, and configured to provide instructions to each display pixel to display one of the at least three primary colors by executing steps:

receiving image data for each display pixel from the device memory;

defining a separation cumulate for each display pixel by converting the image data with a look up table;

defining a separation cumulate threshold array, wherein each portion of the separation cumulate threshold array includes at least two display pixels and a separation cumulate threshold for each of the at least three primary colors; and sending instructions to each display pixel to display the one of the at least three primary colors for which the separation cumulate for the one of the at least three primary colors exceeds the separation cumulate threshold array for the portion of separation cumulate threshold array covering that display pixel.

2. The color electrophoretic display of claim 1, wherein the one of the at least three primary colors at each display pixel (i,j) is determined by $$y(i,j)=P_k \text{ for } \Lambda_k(i,j)>T(i,j) \text{ but } \Lambda_{k-1}(i,j)\leq T(i,j).$$

3. The color electrophoretic display of claim 1, wherein the separation cumulate threshold array incorporates a Blue Noise Mask (BNM).

4. The color electrophoretic display of claim 1, wherein the master controller is further configured to put the image data through a sharpening filter before defining a separation cumulate and defining a separation cumulate threshold array.

5. The color electrophoretic display of claim 4, wherein the sharpening filter is a finite impulse response (FIR) filter.

6. The color electrophoretic display of claim 1, wherein each display pixel is capable of displaying four primary colors, and the four primary colors are cyan, yellow, magenta, and black.

7. The color electrophoretic display of claim 1, wherein each display pixel is capable of displaying four primary colors, and the four primary colors are red, green, blue, and white.

8. The color electrophoretic display of claim 1, wherein each display pixel is capable of displaying eight primary colors and the eight primary colors are white, red, green, blue, cyan, yellow, magenta, and black.

9. The color electrophoretic display of claim 1, wherein the color electrophoretic medium includes a plurality of electrically charged particles disposed in a fluid and capable of moving through the fluid under an influence of an electric field.

10. The color electrophoretic display of claim 1, wherein the plurality of electrically charged particles and the fluid are confined within a plurality of capsules or microcells.

* * * * *